United States Patent [19]

Markle et al.

[11] 4,241,390

[45] Dec. 23, 1980

[54] SYSTEM FOR ILLUMINATING AN ANNULAR FIELD

[75] Inventors: David A. Markle, Norwalk; Abe Offner, Darien, both of Conn.

[73] Assignee: The Perkin-Elmer Corporation, Norwalk, Conn.

[21] Appl. No.: 875,453

[22] Filed: Feb. 6, 1978

Related U.S. Application Data

[60] Division of Ser. No. 725,351, Sep. 26, 1976, abandoned, which is a continuation-in-part of Ser. No. 671,405, Mar. 29, 1976, abandoned, which is a continuation of Ser. No. 509,599, Sep. 26, 1974, abandoned.

[51] Int. Cl.³ .............................................. F21V 7/00
[52] U.S. Cl. .................................. 362/299; 313/220; 350/55; 353/99
[58] Field of Search ............... 362/263, 268, 297, 299, 362/301, 302, 305, 331, 335; 350/13, 55, 199, 202, 206, 292, 294, 299; 313/220, 227, 184, 110, 111, 114; 353/99

[56] References Cited

U.S. PATENT DOCUMENTS

| 3,117,248 | 1/1964 | Lake | 313/220 |
| 3,748,015 | 7/1973 | Offner | 350/199 |
| 3,821,763 | 6/1974 | Scott | 350/206 |
| 3,878,419 | 4/1975 | Lafiandra | 313/220 |
| 3,927,342 | 12/1975 | Bode | 313/220 |
| 3,951,546 | 4/1976 | Markle | 350/199 |

Primary Examiner—Donald P. Walsh
Attorney, Agent, or Firm—Salvatore A. Giarratana; Francis L. Masselle; Edwin T. Grimes

[57] ABSTRACT

This invention relates to a system for illuminating an annular field disposed about an axis characterized by an arcuate source of radiation disposed concentrically about the axis, and an annular field imaging system having an axis of symmetry coincident with said axis for forming an image of the arcuate source on the annular field.

34 Claims, 11 Drawing Figures

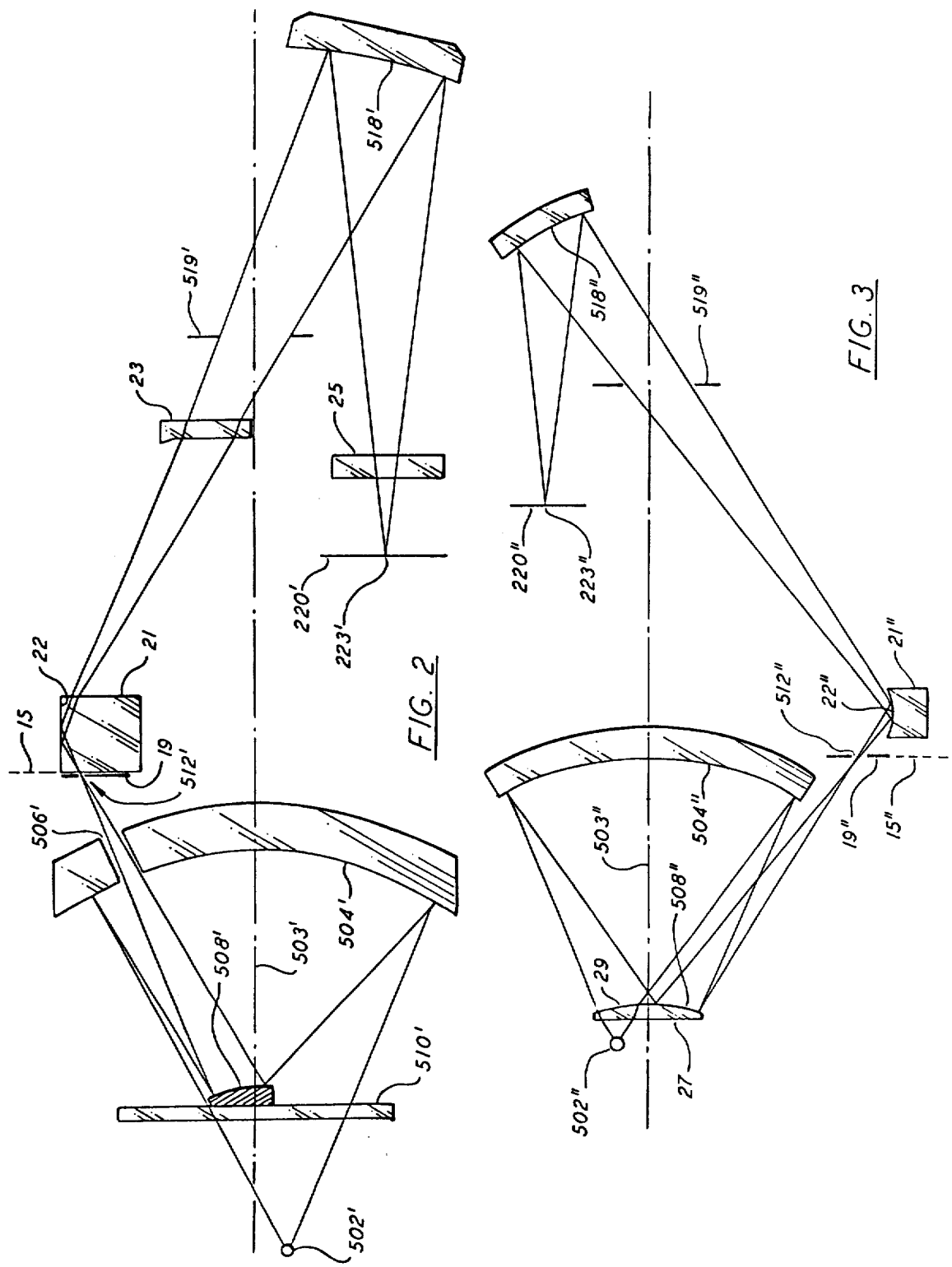

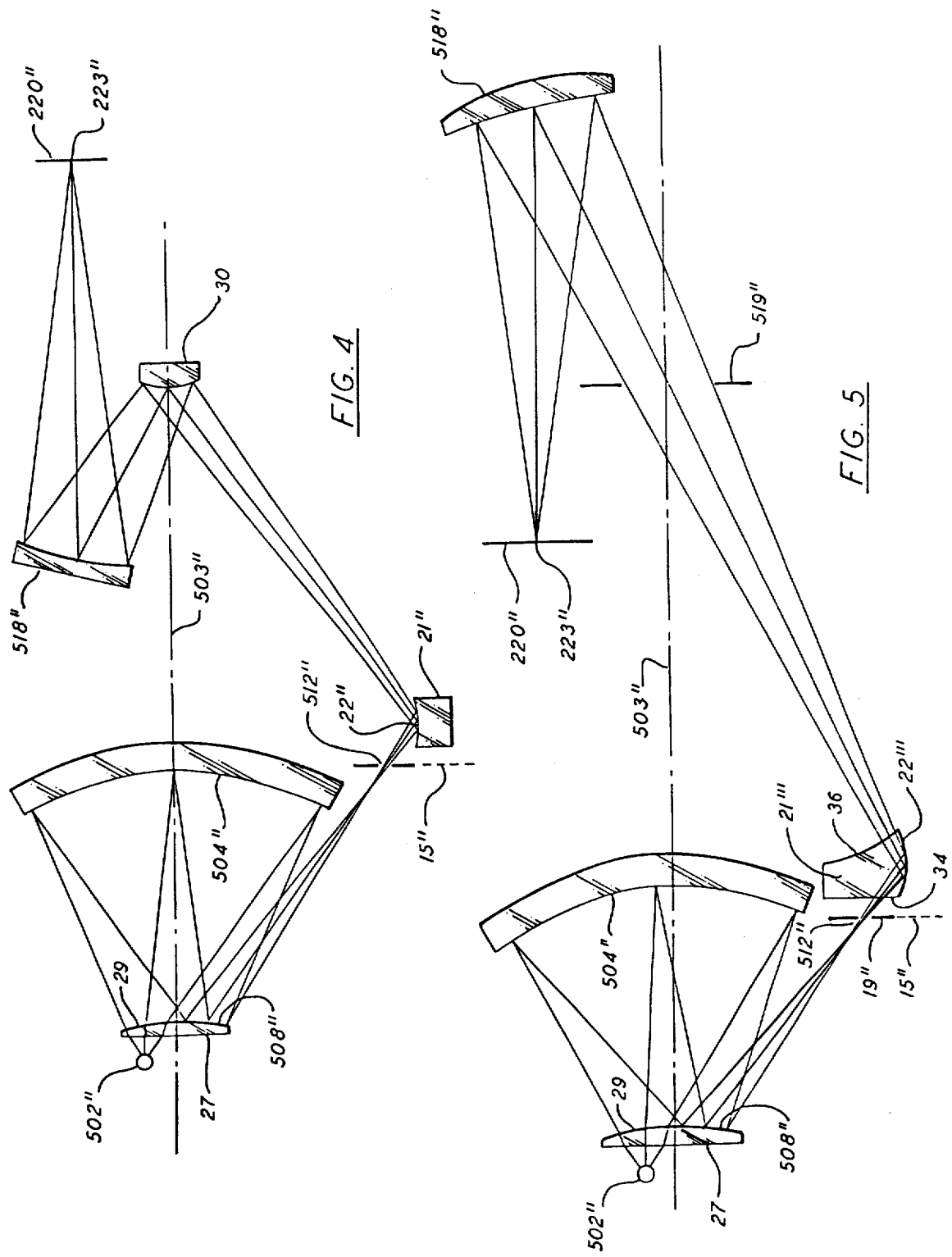

SYSTEM FOR ILLUMINATING AN ANNULAR FIELD

This is a division of application Ser. No. 725,351, filed Sept. 26, 1976, abandoned which in turn is a continuation-in-part of application Ser. No. 671,405, filed Mar. 29, 1976, which in turn, is a continuation of application Ser. No. 509,599, filed Sept. 26, 1974.

BACKGROUND OF THE INVENTION

The invention relates to illumination systems, and more particularly to a system for illuminating an annular field. Illuminating systems constructed in accordance with the concepts of this invention are particularly adapted, among other possible uses, for use in optical projecting and scanning apparatus such as, for example, the one disclosed in U.S. Application Ser. No. 671,653 filed Mar. 29, 1976, that is a continuation of application Ser. No. 339,860, filed Mar. 9, 1973, which was copending with Applicants' parent application, and is assigned to the same assignee as the present invention. The apparatus therein uses an annular field optical system of the type disclosed in U.S. Pat. No. 3,748,015 issued July 24, 1973 which, in turn, utilizes the annular field imaging principle disclosed in U.S. Pat. No. 3,821,763 issued June 28, 1974. Both of these patents are assigned to said common assignee. While a number of different types of illuminating systems have been employed heretofore with moderate success, our contribution to the art is a new system, which is an improvement over such prior art systems, as will become apparent as the description proceeds.

SUMMARY OF THE INVENTION

In order to accomplish the desired results we provide, in one form of the invention, a new and improved system for illuminating an annular field disposed about an axis which includes, in combination, an arcuate source of radiation, preferably disposed concentrically about the axis, and an annular field imaging system having an axis of symmetry coincident with said axis for forming an image of the arcuate source on the annular field.

According to an aspect of the invention, the field imaging system includes a reflective field element, which in one form thereof has a reflective concave toroidal surface with an axis of symmetry coincident with the axis of the system. In some installations it may take a catadioptric form, and further, the exit face thereof may be a spherical surface with its center on the axis of the system. In another form the field element has a reflective surface of cylindrical configuration disposed with its cylindrical axis coincident with the axis of the system. That is, in the last mentioned form, the field element may be a solid cylindrical segment oriented so that its axis and the optical axis of the system are essentially coincident, with the element being formed of transparent refractive material. Moreover, in some installations, a field stop may be disposed proximate said field element on the side toward the arcuate source of radiation.

According to another feature of the invention, the arcuate source of radiation is a high pressure vapor, preferably mercury, lamp of capillary dimensions and of arcuate configuration.

Further, in accordance with an aspect of the invention, means are provided for forming an image, preferably magnified, of the arcuate source at the field stop, or at the reflective field element, which includes a concave primary mirror facing the arcuate source of radiation and having an axis of symmetry coincident with the axis of the system, and a convex secondary mirror located between the arcuate source and the primary mirror to receive radiation or light from the primary mirror and direct it toward the field stop. In one embodiment, the primary mirror has a centrally disposed aperture and in another embodiment the primary mirror has an arcuately-shaped slit, concentric with respect to the axis of the system, through which the radiation passes from the secondary mirror to the field stop. In still another embodiment there is no aperture in the primary mirror, but the secondary mirror is in the form of an aspheric lens having one portion of the convex surface thereof reflectively coated, to serve as the secondary mirror, and a second portion is transparent so that the radiation from the source is transmitted therethrough to the primary mirror.

In addition, according to another aspect of the invention, the annular field imaging system includes first and second field lenses having axes of symmetry coincident with the axis of the system, and the field stop is interposed therebetween. In this embodiment a transfer mirror is provided for forming a real image of the field stop, and an aperture stop is located one focal length ahead of the transfer mirror. Preferably the field lenses are plano-convex spherical lenses.

Still further, in another embodiment of the invention, the field imaging system includes, in addition to the reflective field element proximate the field stop, a transfer mirror for forming a real image of the field stop and an aperture stop so located with respect to the transfer mirror that the exit pupil appears at a desired location, when viewed in the focal plane of the annular field. In one form thereof, an aspheric element, having an axis of symmetry coincident with the axis of the system, is interposed between the reflective field element and the aperture stop. In one embodiment the aperture stop is in the form of a weak convex mirror, to thereby make the relay system inverse telephoto, and preferably this convex mirror is disposed one focal length in front of the transfer mirror.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended thereto. Those skilled in the art will appreciate that the conception upon which the disclosure is based may readily be utilized as a basis for the designing of other systems for carrying out the several purposes of the invention. It is important, therefore, that the claims be regarded as including such equivalent systems as do not depart from the spirit and scope of the invention.

Specific embodiments of the invention have been chosen for purposes of illustration and description, and are shown in the accompanying drawings, forming a part of the specification.

BRIEF DESCRIPTION OF THE DRAWINGS

FIG. 2 is a schematic representation of a second embodiment of the system for illuminating an annular field according to the invention;

FIG. 3 is a schematic representation, similar to FIG. 2, but showing still another embodiment of the invention.

FIG. 4 is a schematic representation, similar to FIG. 3, but showing an embodiment including an inverse telephoto relay system;

FIG. 5 is a schematic representation, similar to FIG. 3, but showing an alternate form of field element;

DETAILED DESCRIPTION OF THE PREFERRED EMBODIMENTS

Figure 1:
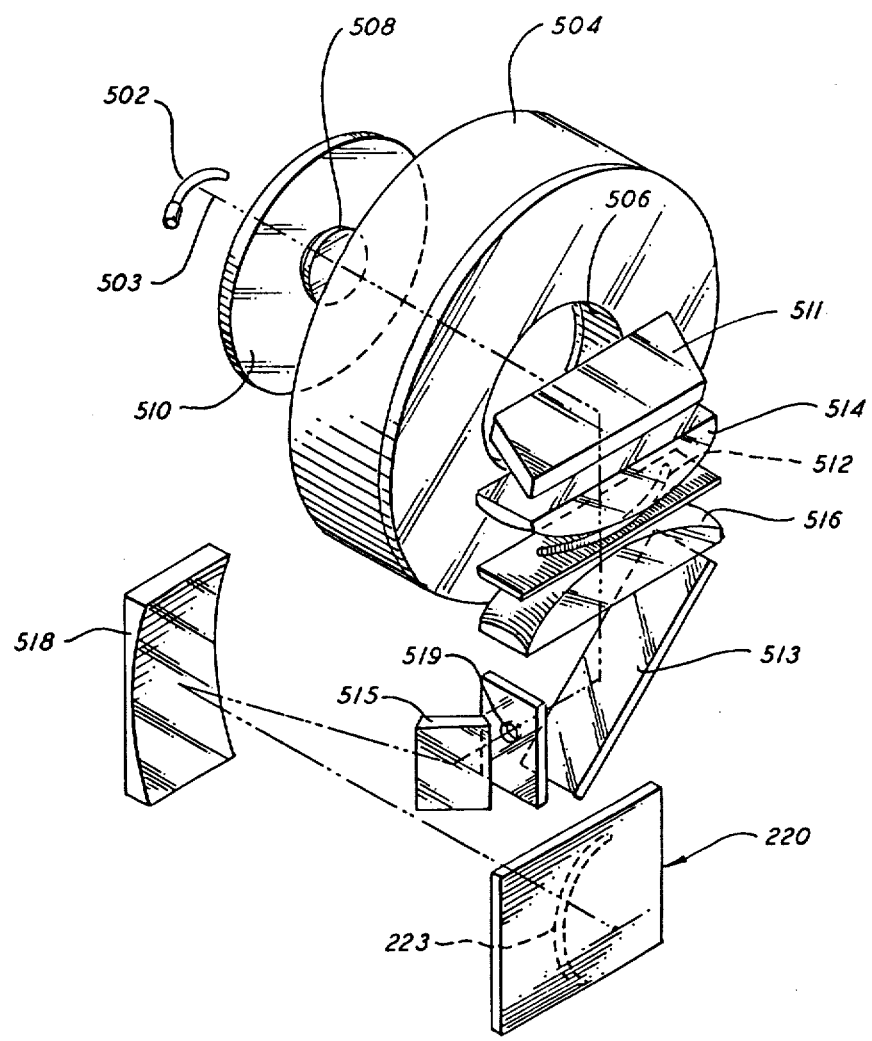
FIG. 1 is a perspective view of a system for illuminating an annular field, constructed in accordance with the concepts of the present invention.

In the embodiment of the condenser or illumination system of the present invention illustrated in FIG. 1, the condenser system includes, as a light source, a mercury capillary lamp 502 of arcuate shape, a concave primary mirror 504 centrally apertured at 506, and a convex secondary mirror 508 supported on a plate 510 of suitably transparent material capable of passing both the visible and ultraviolet light produced by the lamp.

An arcuate image of the lamp 502 is formed by the mirrors 504 and 508 (and with the aid of a plane mirror 511) at the plane of an arcuate slit 512 disposed between field lenses 514 and 516. These lenses are segments of plano-convex spherical lenses. The illumination system is so disposed that the illumination slit at 512, as reimaged by plane mirrors 513 and 515 and by a transfer mirror 518, appears in the plane of a mask 220, and more particularly in the plane in which the surface of the mask near the reader is moved on the carriage as described in conjunction with FIGS. 9 to 11 of the aforementioned U.S. Patent application Ser. No. 339,860. The fraction of the mask thus illuminated is indicated at 223. The arcuate illuminated area 223 is fixed in position with reference to the image forming system disclosed in said application. As disclosed therein, the image forming system is in accordance with the teaching of U.S. Pat. No. 3,748,015 referred to hereinbefore and has an axis of symmetry which passes through the center of curvature of the arcuate area 223. The area 223 of the figure thus constitutes an extra axial annular object for that image forming system and for that extra axial object the imaging system possesses optimum correction as described in the aforementioned U.S. Patent.

The high pressure mercury capillary arc 502 is made to operate as an annular source by properly shaping the envelope. A suitable lamp is described in U.S. Pat. No. 3,878,419, which is assigned to the same assignee as the present invention. This patent matured from an application, which was copending with the parent application of the present application. Light from this lamp is imaged by the above described reflecting objective comprising the concave mirror 504, the convex mirror 508 and the field lenses 514 and 516. This reflecting objective has an entrance pupil imaged substantially at the convex mirror 508 which partially obscures the aperture of the condenser system. However, the obscuration is substantially the same for the imagery of all parts of the light source. The field lenses 514 and 516 form an image of the entrance pupil at the aperture stop 519, which is one focal length ahead of the mirror 518. The transfer mirror 518 forms a collimated image of the stop 519, which is the exit pupil of the condenser. At the same time, the annular slit 512 is imaged by the mirror 518 at 223 to form a field stop on the mask 220. The elements of the condenser are disposed to obtain a common axis of symmetry 503 with the center of curvature of the arcuate light source 502 on this axis. In this case, the condenser system is an annular field optical system in accordance with the principle of off-axis annular field optical imagery disclosed in the above mentioned U.S. Pat. No. 3,821,763. The size of the stop 519 can be changed, if desired, to alter the degree of partial coherence of the illumination at the mask 220, which is provided to the subsequent imaging system.

It will thus be seen that this embodiment of the invention provides a new and improved optical condenser system for use in an annular field optical system, which permits efficient uniform illumination of the instantaneous annular field of an optical system in which the object is transilluminated.

In the embodiment of the invention illustrated in FIG. 2, the condenser system for illuminating an annular field comprises, in combination, high pressure mercury capillary lamp 502' of arcuate configuration, which is the same as the lamp 502 described hereinbefore in connection with the embodiment of FIG. 1. The lamp 502' is disposed with its arcuate plasma concentric with respect to the optical axis 503' of the system. In order to present a magnified image of the lamp plasma (hereinafter referred to as the "arc") in a plane indicated at 15 in FIG. 2, the arc is reflected from a concave primary mirror 504' and a convex secondary mirror 508', which together form a reflecting objective.

The primary mirror 504' is preferably fabricated of Pyrex glass and the secondary mirror 508' of aluminum, for example. The seconday mirror is mounted on a window 510' preferably of fused silica, which in addition to supporting the secondary mirror serves to isolate the remainder of the optical system from air jets (not shown), which are normally employed to cool the mercury lamp 502'. The primary mirror 504' contains an aperture, which is in the form of a slit 506', and through which the magnified image passes to reach the plane 15. It will be appreciated that the pupil stop of the reflective objective is sufficiently near the secondary mirror that obscuration is minimal and nearly identical for all points along the lamp arc.

To obtain an accurately delineated annular illuminated field at a position where it is undesirable to put a field stop, the illumination system must provide an intermediate image position, at which an arcuate slit may be placed. In the embodiment of the invention illustrated in FIG. 2, a member 19, containing an arcuate slit 512', concentric with the axis, is positioned at the plane 15 and serves as a field stop. The final image is determined by the size of this slit.

Field elements are required to direct the light from all portions of the source into the desired pupil stop of the system. We have invented a new form of field element, which is reflecting or catadioptric. Since it is to be used in a ring field system, the new field element is a portion of a surface of revolution about the optical axis. Thus, after passing through the slit, the light is reflected by total internal reflection in a catadioptric, cylindrical element 21, which has its cylindrical surface 22 disposed in concentric relationship with respect to the axis 503'. This element is a solid cylindrical segment generated by a plane passed through a cylinder containing or parallel to its cylinderical axis. It is formed of transparent refractive material, preferably fused silica, so that it will be highly transparent to ultraviolet actinic light. The light coming to a focus at each point of the annular slit 512' is propagating away from the optical axis 503' with the central rays along a cone with its apex on the axis at a point slightly to the left, as viewed in FIG. 2, of the convex mirror 508'. The element 21 redirects this light so that the central rays travel along a cone with its vertex on the axis at a circular pupil stop 519'.

Although the refracting material introduces some variations of imagery with color, in many applications this is quite tolerable. It will be particularly appreciated that the cylindrical element 21 is a new form of field element, which functions as a field lens, and is particularly useful in annular field systems. Other alternative forms of this field element are described hereinafter in connection with the embodiments of FIGS. 3 to 10.

Light from the field element 21 is refracted through an aspheric element 23, which is also preferably of fused silica, and then passes through the circular pupil stop 519', mounted concentrically about the axis 503'. The aspheric element 23 corrects for aberrations of the imagery of the slit 512' and gives a much sharper slit image than would otherwise be the case.

The image, after passage through the pupil stop 519', is reflected by an aspheric or spherical mirror 518', preferably of Pyrex. The combination of the cylindrical field element 21, the aspheric element 23 and the concave mirror 518' act to image the slit 512' at 223' in a focal plane 220', where the illumination is required. It will be particularly appreciated that the pupil stop 519' is disposed at one focal length in advance of the spherical mirror and is so positioned that the exit pupil appears at infinity, when viewed in the focal plane 220'. The focal plane 220' can be the plane of a microcircuit mask in a system such as the one described in the aforementioned Patent Application Ser. No. 339,860.

It is noted that, if desired, the light reflected from the mirror 518' may be passed through an actinic filter 25, which is usually inserted during the alignment process to remove the ultraviolet light, thereby preventing exposure of the photosensitive member at that time. In addition, the pupil stop 519' can be made adjustable or can be varied to alter the degree of partial coherence of the illumination at the focal plane 220'.

It is noted that the system of FIG. 2 is particularly desirable where space considerations are important. For example, the system of FIG. 2 only requires a seven inch diameter primary mirror, whereas the system of FIG. 1 would require a ten inch diameter primary mirror to achieve comparable results.

In the embodiment of the invention illustrated in FIG. 3, the condenser system for illuminating an annular field comprises, in combination, a high pressure mercury capillary lamp 502" of arcuate configuration, which is the same as the lamps 502 and 502' described hereinbefore in connection with the embodiments of FIGS. 1 and 2. This lamp is also disposed with its arcuate plasma concentric with respect to the optical axis 503" of the system. In order to present a magnified image of the lamp arc in a plane indicated at 15" in FIG. 3, the arc is reflected from a concave primary mirror 504" and a convex secondary mirror 508", which together form a reflecting objective. In this embodiment there is no aperture through the concave primary mirror 504" and the convex secondary mirror 508" is included as part of an element 27, which is in the form of an aspheric lens having one-half of the convex surface thereof reflectively coated. The radiation from the lamp 502" is transmitted to the primary mirror 504" through the transparent half 29 unobscured by the reflective half, which serves as the secondary mirror 508". That is, the secondary mirror 508" presents no obscuration for an arc subtending 90° at the center line and containing an f/0.8 divengence angle, larger angles and corresponding higher f/Numbers are possible up to an arc subtending 180° at f/∞.

A member 19", containing an arcuate slit 512", concentric with the axis, is positioned at the plane 15" and serves as a field stop. As indicated hereinbefore in connection with the embodiment of FIG. 2, the final image is determined by the size of this slit. After passing through the slit 512", the light is reflected by a concentrically disposed reflective field element 21", which has a concave toroidal surface 22" that reflects radiation from the image at the annular slit 512". The concave toroidal surface is contoured by radii, which both are of finite length. Light from the field element 21" passes through a circular pupil or aperture stop 519", mounted concentrically about the axis 503", and thence, it is reflected by a spherical or aspheric mirror 518". The combination of the field element 21" and the concave mirror 158" act to image the slit 512" as at 223" in a focal plane 220", where the illumination is required. As in the embodiment of FIG. 2, the pupil stop 519" is disposed at one focal length in advance of the transfer mirror and is so positioned that the exit pupil appears at infinity, when viewed in the focal plane 220".

An example of suitable design parameters for the optical apparatus of FIG. 3, with an f/3.5 image subtending an 80° angle about the optical axis thereof, is given in the following table:

| Component | Radius-millimeters | Separation-millimeters | Comments |
| --- | --- | --- | --- |
| Lamp plane | ∞ | 10.15 | (1) |
| Aspheric lens front | ∞ | 8.1 | Fused Silica |
| back | (2) | 110 | |
| Primary mirror | 131.5 | −110 | |
| Aspheric mirror | (2) | 108.6 | |
| Slit | ∞ | 20 | Slit radius = 97 mm. |
| Toroid | (3) | 149.2 | |
| Stop | ∞ | 89.2 | 30 mm. diameter |
| Aspheric Transfer mirror | (4) | 128.6 | |
| Focal plane | ∞ | | |

(1) The lamp bore has a 1 mm. radius, and the fused silica lamp envelope has a 3 mm. radius. The lamp is concentric with the optical axis, the center of the bore being 14 mm. from the axis.

(2) Equation of aspheric is:

$$S_{aj} = y^2 (57.05 + \sqrt{57.05^2 - 1.57186y^2})^{-1} + 6.403 \times 10^{-7} y^4$$

(3) Toroid has a radius of 112 mm. normal to the optical axis and a radius of 310.775 parallel to the optical axis.

(4) Equation of aspheric is:

$$S_{aj} = y^2 (188.826 + \sqrt{188.826^2 - .31297y^2})^{-1} + 6.924 \times 10^{-9} y^4 + 1.391 \times 10^{-12} y^6$$

Referring next to the embodiment of the invention illustrated in FIG. 4, this embodiment is similar to the embodiment of FIG. 3, but is employed when a greater distance is required between the aspheric mirror 518" and the image plane 220". In this embodiment, the aperture stop 519" of FIG. 3 is replaced by a weak convex mirror 30 to thereby make the relay system inverse telephoto. The convex mirror 30 also serves as the aperture stop and is disposed one focal length in front of the mirror 518" so that the pupil as seen from the image plane 220" is at infinity. The distance between the mirror 518" and the image plane 220" is controlled by varying the power of the convex mirror 30. The portion of the system of FIG. 4 in front of the convex mirror 30 is the same as the portion of the system of FIG. 3 in front of the stop 519". Thus, an image of the slit 512" is formed at 223" in the focal plane 220", where the illumination is required.

FIG. 5 illustrates another embodiment of the invention. This embodiment is the same as the embodiment of FIG. 3, except for the field element 21. The field element 21''' of FIG. 5 is a catadioptric reflective toroidal field element, which has a concave toroidal surface 22''' that reflects radiation from the image at the annular slit 512". The concave toroidal surface is contoured by radii, which are both of finite length. That is, the toroidal surface is generated by rotating the circular section shown about the optical axis 503" so that it is a portion of a surface of revolution about this axis. The center of curvature of the circular section is above the axis in the illustrated embodiment. This field element is formed of transparent refractive material, preferably fused silica, so that it will be highly transparent to ultraviolet actinic light. The toroidal field element 21''' has a plane entrance face 34 and a spherical exit face 36. That is, the exit face is a spherical surface with its center of curvature on the optical axis 503". As a result, in this catodiaptric field element, variations of imagery with color are minimized, when the center of curvature of the exit face is substantially at the center of the pupil image at 519".

It will be appreciated that any one of the field elements 21 described hereinbefore in connection with each of the embodiments of FIGS. 2 to 5 may equally well be employed with any other one of these embodiments. In addition, FIGS. 6 to 11 illustrate additional forms of the field element, any one of which being applicable to any one of the embodiments of FIGS. 2 to 5. In these embodiments, the entrance pupil of the system seen by the field element, as described in connection with FIGS. 2 to 5, is schematically illustrated at 38, and the pupil image is schematically illustrated at 40.

The pupil and the pupil image are both concentric about the optical axis 503 of the system.

Figure 6:
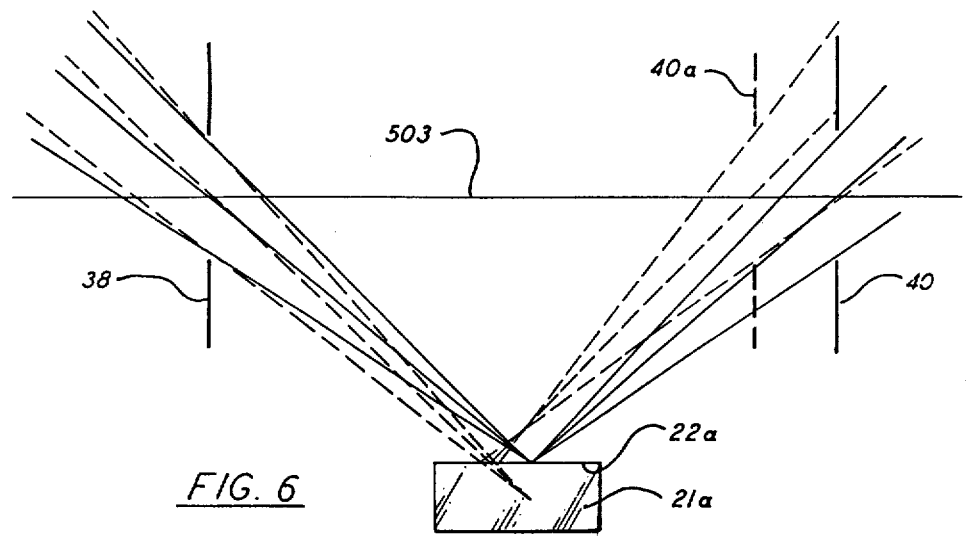
FIG. 6 is an enlarged schematic representation of a field element, constructed according to the invention, in the form of a reflective surface of cylindrical configuration.
Figure 7:
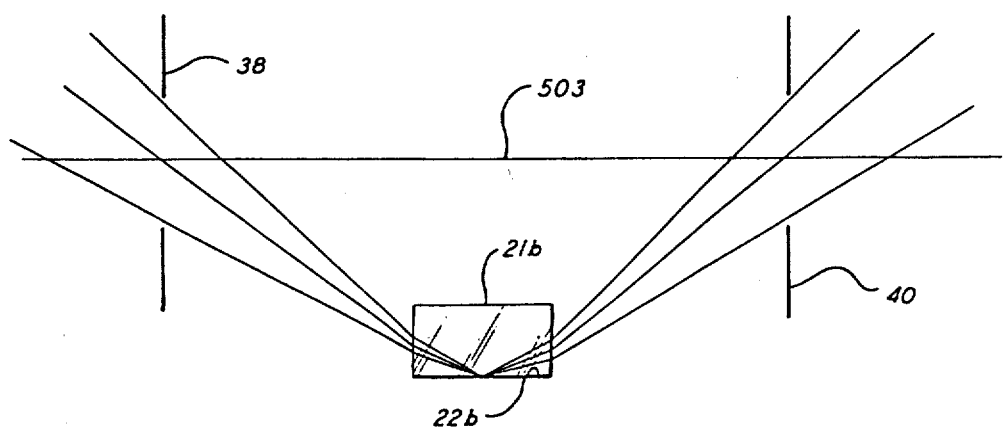
FIG. 7 is an enlarged schematic representation of a field element similar to FIG. 6, but showing a catadioptric form thereof.

FIG. 6 illustrates the field element in its simplest form. In this embodiment the field elements 21a is a reflecting cylindrical surface 22a disposed with its cylinder axis coincident with the optical axis 503. As seen in FIG. 6, all points in a ring that pass through the pupil to form a ring image at or near the reflecting surface pass through an image of the pupil. The field element 21b of FIG. 7 is a catadioptric form of the field element 21a of FIG. 6. In FIG. 7 surface 22b is a reflecting cylindrical surface disposed with its cylindrical axis coincident with the optical axis 503. It is noted that the embodiment of FIG. 7 is similar to the embodiment of FIG. 2, except that in FIG. 7 the center of the annular illuminated area is in the cylindrical surface whereas in FIG. 2 an arcuate slit 512' is provided whereat the center of the annular illuminated area is located. This distinction will be discussed more fully hereinafter. The elements 21, 21a and 21b of FIGS. 2, 6 and 7 serve as field elements only along the length of the annular field. In applications in which the annulus is narrow, this is acceptable. However, for installations requiring a wide annulus, there will not be a unique pupil image location for radiation passing through radially separate portions of the annular field, as shown by the broken-line rays in FIG. 6. This problem is overcome by substituting the toroidal elements 22", 22c and 22d of FIGS. 3, 8 and 9 for the cylindrical elements 21, 21a and 21b of FIGS. 2, 6 and 7, respectively. In these toroidal elements, sufficient power is introduced in the planes of the drawings to also image the pupil in these planes.

Figure 8:
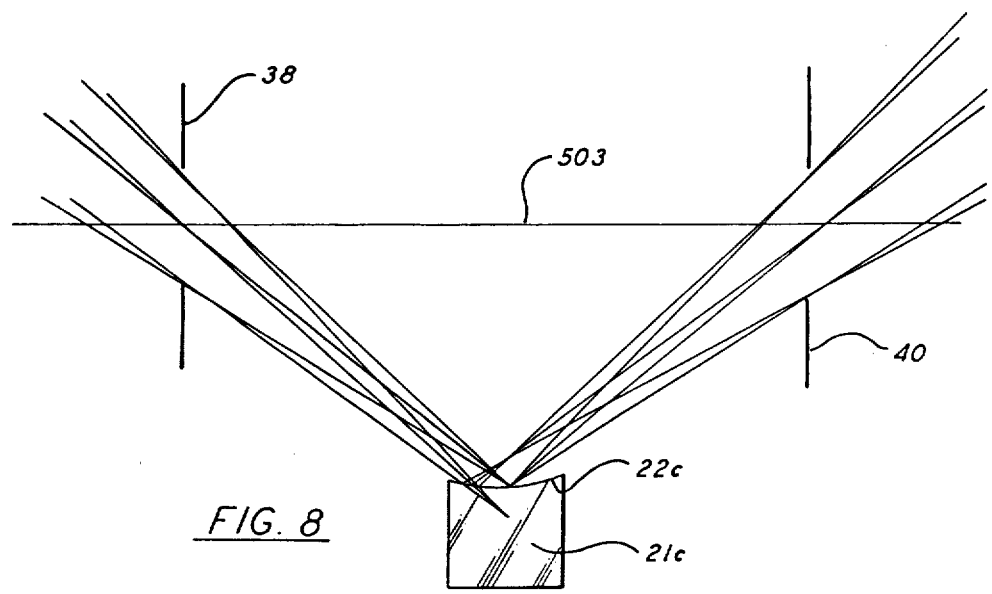
FIG. 8 is an enlarged schematic representation of a field element, constructed according to the invention, in the form of a reflective concave toroidal surface.
Figure 9:
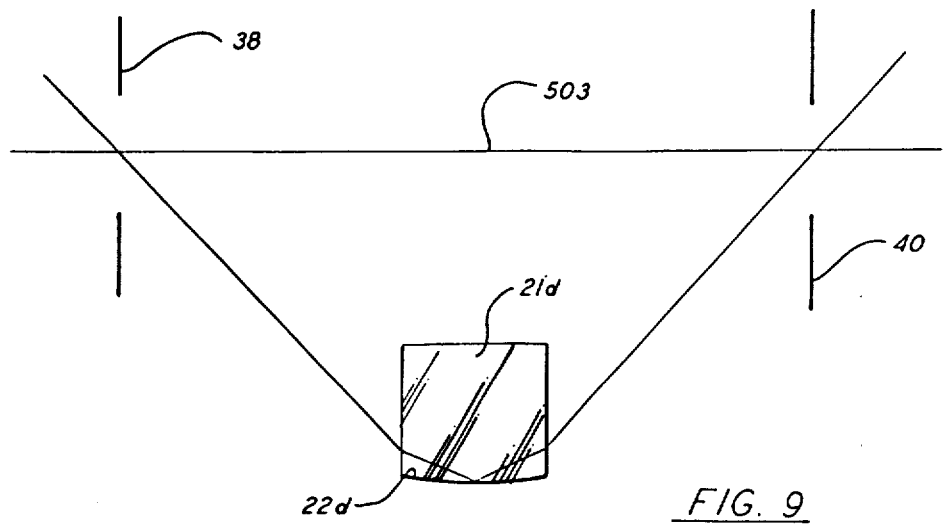
FIG. 9 is an enlarged schematic representation of a field element similar to FIG. 8, but showing a catadioptric form thereof.

The toroidal surface 22c and 22d of FIGS. 8 and 9, respectively, are each generated by rotating the circular section shown about the optical axis 503 so that it is a portion of a surface of revolution about this axis. The center of curvature of the circular section is above the optical axis in this case. It is noted that the cylindrical field element 21a of FIG. 6 is a special case of this toroidal element in which the center of curvature of the circular section is at infinity so that the circular section becomes a straight line. FIG. 9 illustrates a catadioptric version of the field element of FIG. 8 wherein a reflecting surface 22d, corresponding to surface 22c of FIG. 8, is obtained by putting a reflecting surface on transparent refracting material. It is noted that the embodiment of FIG. 8 is similar to the embodiment of FIG. 3, except that in FIG. 8 the center of the annular illuminated area is in the toroidal surface whereas in FIG. 3 an arcuate slit 512" is provided whereat the center of the annular illuminated area is located.

Figure 10:
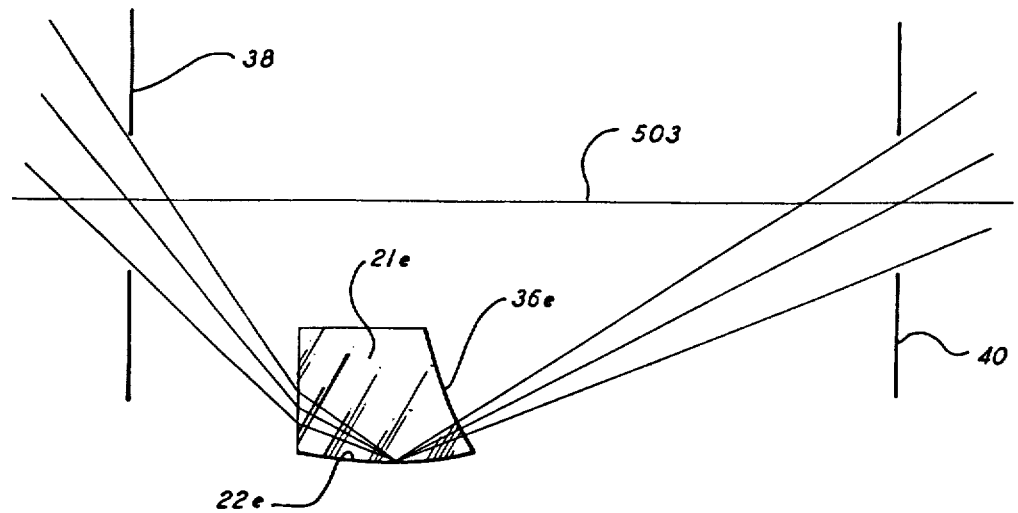
FIG. 10 is an enlarged schematic representation of a field element similar to FIG. 9, but showing an element having an exit face in the form of a spherical surface.

In the field elements illustrated in FIGS. 2–4 and 6–9, the angle between the optical axis and the converging bundle of rays at the pupil is the same as that between the axis and the diverging bundle at the pupil image. A field element 21e which alters this angle is shown in FIG. 10. The field element 21e is a modification of the catadioptric field element 21d shown in FIG. 9. The toroidal surface 22e is the same as the toroidal surface 22d. In the field element 21e, a spherical surface 36e with its center on the optical axis 503 is substituted for the plane exit face of the field element 21d of FIG. 9. In this catadioptric field element, variations of imagery with color are minimized when the center of curvature of the exit face is substantially at the center of the pupil image 40.

However, it is also desirable in some installations, depending on the space available, to reverse the system of FIG. 10 so that the pupil image and pupil are interchanged, and the exit and entrance faces of the field element are interchanged, whereby the angle between the imaging forming bundle and the optical axis becomes larger at the pupil image.

It is noted that the embodiment of FIG. 10 is similar to the embodiment of FIG. 5, except that in FIG. 5 the center of the annular illuminated area is in the toroidal surface whereas in FIG. 5 an arcuate slit 512" is provided whereat the center of the annular illuminated area is located.

Figure 11:
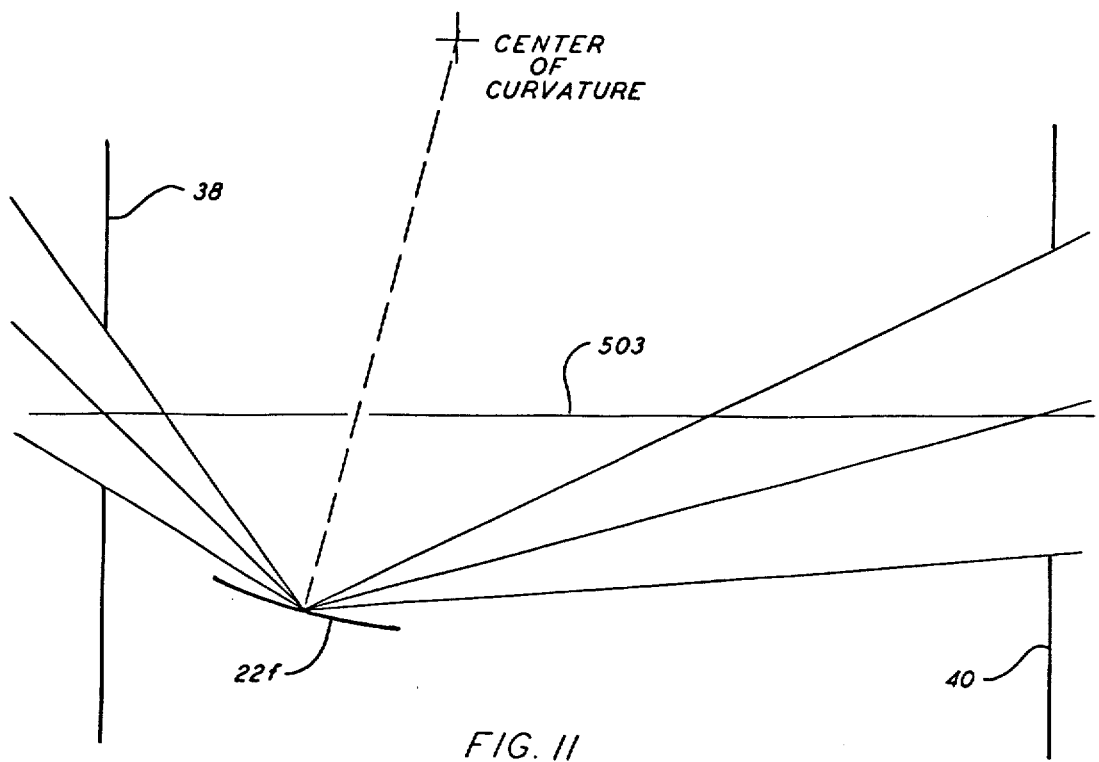
FIG. 11 is an enlarged schematic representation showing still another field element.

Another means of obtaining a difference between the angles which the converging and diverging bundles make with the axis is shown in FIG. 11. As in the other field elements, the reflecting surface 22f is a toroid which is concentric about the axis. It differs from the other field elements in that the normal from its middle point is not perpendicular to the axis.

As indicated hereinbefore, the field elements of FIGS. 6 to 11 have been shown with the center of the annular illuminated area in the toroidal surface. However, it will be appreciated that their operation is substantially the same when the annular image is external to the field element, but close to it as shown in FIGS. 2 to 5, wherein the physical slits 512' and 512" are placed at the annular illuminated area. With the arrangements of FIGS. 2 to 5, astigmatism is introduced into the imagery of the annular area. That is, the focus of the radial elements is not at the same position as the focus of the tangential elements, but this is desirable in a ring field illuminating system since at the tangential focus of the image of the physical slit, the delimiting edges are in sharp focus while residual variations in illumination along the arcuate area are averaged out.

It will thus be seen that the present invention does indeed provide a new and improved system for illuminating an annular field, which has a high degree of field illumination uniformity, reduced aberrations, and a simplified optical arrangement. In addition, the new system provides uniform illumination over a wide spectral band including the ultraviolet region by means of reflecting optics, and delimits the annular illuminated field accurately when the field is at a location where it is undesirable to put a field stop. Although specific embodiments have been illustrated and described, it will be obvious to those skilled in the art that various modifications may be made without departing from the spirit and scope of the invention, which is to be limited solely by the appended claims.

We claim:

1. A system for illuminating an annular field disposed about an axis, comprising, in combination:
    an arcuate source of radiation disposed concentrically about said axis; and
    an annular field imaging system including a reflective field element having an axis of symmetry coincident with said axis for forming an image of said arcuate source on said annular field.

2. A system for illuminating an annular field disposed about an axis according to claim 1 wherein said field element has a reflective concave toroidal surface having an axis of symmetry coincident with the axis of the system.

3. A system for illuminating an annular field disposed about an axis according to claim 1 wherein said field element is of catadioptric form.

4. A system for illuminating an annular field disposed about an axis according to claim 2 further including a field stop proximate said field element.

5. A system for illuminating an annular field disposed about an axis according to claim 2 wherein said toroidal surface has a second finite radius of curvature which is greater than the distance of said surface from said axis.

6. A system for illuminating an annular field disposed about an axis according to claim 2 wherein said field element is of catadioptric form and has an entrance face and an exit face, and one of said faces is a spherical surface with its center on the axis of the system.

7. A system for illuminating an annular field disposed about an axis according to claim 6 wherein said spherical surface is the exit face, and wherein the center of the spherical surface is located substantially at the center of a pupil image of the system.

8. A system for illuminating an annular field disposed about axis according to claim 1 wherein said field element has a reflective surface of cylindrical configuration disposed within its cylindrical axis coincident with the axis of the system.

9. A system for illuminating an annular field disposed about an axis according to claim 1 further including an arcuately-shaped field stop intermediate said source and the annular field, and means for forming an image of said arcuate source at said field stop.

10. A system for illuminating an annular field disposed about an axis according to claim 9 wherein said means for forming an image forms a magnified image.

11. A system for illuminating an annular field disposed about an axis according to claim 9 wherein said means for forming an image comprises a concave primary mirror facing said arcuate source of radiation and having an axis of symmetry coincident with said axis of the system, and convex secondary mirror means having an axis of symmetry coincident with said axis of the system and being located between said arcuate source of radiation and the primary mirror to receive radiation from the primary mirror and direct it toward said field stop.

12. A system for illuminating an annular field disposed about an axis according to claim 11 wherein said primary mirror has a centrally disposed aperture through which the radiation passes from said secondary mirror means toward the field stop.

13. A system for illuminating an annular field disposed about an axis according to claim 11 wherein said primary mirror has an arcuately shaped slit which is concentric with respect to said axis of the system and through which the radiation passes from said secondary mirror means to the field stop.

14. A system for illuminating an annular field disposed about an axis according to claim 11 wherein said primary mirror and said secondary mirror means are so disposed that an image of the entrance pupil thereof is located substantially at said secondary mirror means, whereby the obscuration is nearly identical for all points along the arc of the source of radiation.

15. A system for illuminating an annular field disposed about an axis according to claim 11 wherein said secondary mirror means comprises an aspheric lens having one portion of the convex surface thereof reflectively coated and a second portion transparent, whereby the radiation from the source is transmitted to the primary mirror through the transparent portion.

16. A system for illuminating an annular field disposed about an axis according to claim 1 wherein said field imaging system includes a reflective concave toroidal surface having an axis of symmetry coincident with the axis of the system, and means for forming an image of said arcuate source at said surface.

17. A system for illuminating an annular field disposed about an axis according to claim 16 wherein said means for forming an image comprises a concave primary mirror facing said arcuate source of radiation and having an axis of symmetry coincident with said axis of the system, and convex secondary mirror means having an axis of symmetry coincident with said axis of the system and being located between said arcuate source of radiation and the primary mirror to receive radiation from the primary mirror and direct it toward said toroidal surface.

18. A system for illuminating an annular field disposed about an axis according to claim 17 wherein said primary mirror has an arcuately shaped slit which is concentric with respect to said axis of the system and through which the radiation passes from said secondary mirror means toward said toroidal surface.

19. A system for illuminating an annular field disposed about an axis according to claim 17 wherein said primary mirror and said secondary mirror means are so disposed that an image of the entrance pupil thereof is located substantially at said secondary mirror means, whereby the obscuration is nearly identical for all points along the arc of the source of radiation.

20. A system for illuminating an annular field disposed about an axis according to claim 17 wherein said secondary mirror means comprises an aspheric lens having one portion of the convex surface thereof reflectively coated and a second portion transparent, whereby radiation from the source is transmitted to the primary mirror through the transparent portion.

21. A system for illuminating an annular field disposed about an axis according to claim 1 wherein said annular field imaging system includes first and second field lenses having axes of symmetry coincident with said axis of the system.

22. A system for illuminating an annular field disposed about an axis according to claim 21 further including an arcuately-shaped field stop interposed between said first and second field lenses.

23. A system for illuminating an annular field disposed about an axis according to claim 22 further including a transfer mirror for forming a real image of said field stop.

24. A system for illuminating an annular field disposed about an axis according to claim 23 which includes an aperture stop located one focal length ahead of said transfer mirror.

25. A system for illuminating an annular field disposed about an axis according to claim 24 wherein said first and second field lenses are plano-convex spherical lenses.

26. A system for illuminating an annular field disposed about an axis according to claim 1 further including a field stop intermediate said source and the annular field at which an image of said arcuate source is formed.

27. A system for illuminating an annular field disposed about an axis according to claim 4 wherein said field imaging system further includes an aspheric element having an axis of symmetry coincident with said axis of the system, a transfer mirror for forming a real image of said field stop, and an aperture stop located one focal length ahead of said transfer mirror.

28. A system for illuminating an annular field disposed about an axis according to claim 4 wherein said field imaging system further includes a transfer mirror for forming a real image of said field stop, and an aperture stop located one focal length ahead of said transfer mirror.

29. A system for illuminating an annular field disposed about an axis according to claim 4 wherein said field imaging system further includes a transfer mirror for forming a real image of said field stop, and a convex mirror having an axis of symmetry coincident with the axis of the system located one focal length ahead of said transfer mirror.

30. A condenser system for illuminating an annular field disposed about an axis, comprising, in combination:

an arcuately-shaped illumination source disposed concentrically about said axis;

a concave primary mirror facing said illumination source and having an axis of symmetry coincident with said axis;

a convex secondary mirror having an axis of symmetry coincident with said axis and being located between said illumination source and the primary mirror to receive illumination from the primary source;

an annular field imaging system having an axis of symmetry coincident with said axis for forming an image of said illumination source on said annular field including:

a first plano-convex spherical lens, said primary mirror having an aperture therein through which illumination passes from the secondary mirror to the first lens, a second plano-convex spherical lens, an arcuately-shaped field stop interposed between said first and second lenses, a transfer aspheric mirror for forming a real image of said field stop; and an aperture stop located one focal length ahead of said transfer mirror.

31. A condenser system for illuminating an annular field disposed about an axis, comprising, in combination:

an arcuately-shaped illumination source disposed concentrically about said axis;

a concave primary mirror facing said illumination source and having an axis of symmetry coincident with said axis;

a convex secondary mirror having an axis of symmetry coincident with said axis and being located between said illumination source and the primary mirror to receive illumination from the primary mirror;

an arcuately-shaped field stop at which an image of said illumination source is formed;

an annular field imaging system having an axis of symmetry coincident with said axis for forming an image of said illumination source on said annular field including:

a field element proximate said field stop, said field element having a reflective surface of cylindrical configuration disposed with its cylindrical axis coincident with the axis of the system, an aspheric element having an axis of symmetry coincident with said axis of the system, a transfer mirror for forming a real image of said field stop, and an aperture stop located one focal length ahead of said transfer mirror.

32. A condenser system for illuminating an annular field disposed about an axis, comprising, in combination:
- an arcuately-shaped illumination source disposed concentrically about said axis;
- a concave primary mirror facing said illumination source and having an axis os symmetry coincident with said axis of the system;
- a secondary element comprising an aspheric lens having one portion of a convex surface thereof reflectively coated and a second portion transparent, whereby the illumination from the source is transmitted to the primary mirror through the transparent portion and the reflective portion serves as a secondary mirror for receiving illumination from the primary mirror, said secondary element having an axis of symmetry coincident with the axis of the system;
- an arcuately-shaped field stop at which an image of said illumination source is formed;
- an annular field imaging system having an axis of symmetry coincident with said axis of the system for forming an image of said illumination source on said annular field including:
  - a field element proximate said field stop, said field element having a reflective concave toroidal surface having an axis of symmetry coincident with the axis of the system,
  - a transfer aspheric mirror for forming a real image of said field stop, and
  - aperture stop means located one focal length ahead of said transfer mirror.

33. A system for illuminating an annular field disposed about an axis according to claim 32 wherein said field element is of catadioptric form and has an entrance face and an exit face, said exit face being a spherical surface with its center on said axis of the system.

34. A system for illuminating an annular field disposed about an axis according to claim 32 wherein said aperture stop means is in the form of a convex mirror having an axis of symmetry coincident with the axis of the system.

* * * * *